United States Patent Office 3,477,973
Patented Nov. 11, 1969

3,477,973
ROOM TEMPERATURE CURING ORGANOPOLYSILOXANES
Guenther Fritz Lengnick, Manitou Beach, Mich., and Anthony Enrico Pepe, Sylvania, Ohio, assignors to Stauffer Chemical Company, New York, N.Y., a corporation of Delaware
No Drawing. Filed Dec. 6, 1967, Ser. No. 688,303
Int. Cl. C08g *31/32*
U.S. Cl. 260—18         9 Claims

ABSTRACT OF THE DISCLOSURE

The invention relates to room temperature curing organopolysiloxane compositions which comprise organopolysiloxanes and acyloxy terminated disilaorganic cross-linkers in which the acyloxy groups are bonded to a single silicon atom and a metallic salt of an organic acid. These compositions cure in the presence of ambient moisture to form elastomeric materials.

This invention relates to organopolysiloxanes and more particularly to organopolysiloxane compositions which are curable at room temperature and to a method for preparing the same.

Heretofore, it was known that certain fluid organopolysiloxanes when exposed to atmospheric moisture at room temperature were converted to an elastomeric state. The desirability of room temperature curing systems is well known; however, the conventional room temperature curing systems involved two or more stable components which, when mixed together, rapidly cured to a solid unworkable state. In other words, the end user was provided with a two-package system in which one component was added just prior to use. Although there are many applications where the two-package system is perfectly adequate, there are other applications where this system is not satisfactory because of the lack of skilled workmen or because the equipment is inadequate to carry out the mixing operation necessary.

Consequently, the need for a one-package room temperature curing elastomer brought about the introduction of linear polysiloxanes containing two or more functional acyloxy radicals at the terminal ends of the polymer. While these single component room temperature curing compositions have met with commercial success, it has been difficult to adapt them to some circumstances where extended working time is necessary or desirable. Consequently, it was found that the product obtained from the reaction of trihalodisilaalkanes with organic acids or anhydrides thereof with hydroxyl-terminated organopolysiloxanes provided extended working times, but did not cure to a desirable elastomeric state.

It is therefore an object of this invention to provide an organopolysiloxane which is curable at room temperature. Another object of this invention is to provide compounds which vary in working time without reducing the cross-linking ability of the polymers employed. Still another object of this invention is to provide a curable organopolysiloxane having improved physical properties. Still another object of this invention is to provide novel cross-linking agents which will react with hydroxyl-terminated organopolysiloxanes to form an elastomeric material. A still further object of this invention is to provide an organopolysiloxane composition which may be dispensed in a single packaged system. A still further object of this invention is to provide an organopolysiloxane system which has extended working times, but will cure to a desirable elastomer.

The foregoing objects and others which will become apparent from the following description are accomplished in accordance with this invention, generally speaking, by providing curable compositions comprising metallic salts of organic acids and organopolysiloxanes of the general formulae:

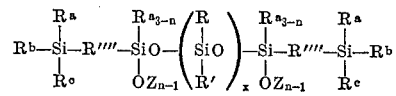

or

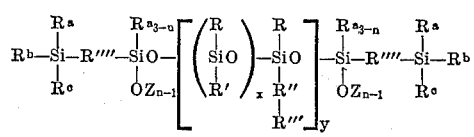

wherein R, R', R$^a$, R$^b$ and R$^c$ which may be the same or different, represent monovalent hydrocarbon radicals, halogenated monovalent hydrocarbon radicals or cyanoalkyl radicals; R'' is a divalent hydrocarbon radical or halogenated divalent radical; R''' is a polymeric organic group linked to R'' by a carbon-to-carbon linkage; R'''' is a divalent hydrocarbon radical or a halogenated divalent hydrocarbon radical; Z is an acyl group having from 1 to 18 carbon atoms; $n$ is an integer greater than 2; $x$ is an integer of from 0 to 20,000 and $y$ is an integer of from 1 to 500.

The curable compositions illustrated above may be prepared by reacting acyloxy-terminated disilaorganic crosslinkers of the formula:

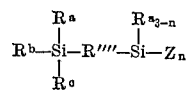

with organopolysiloxanes having the general formulae:

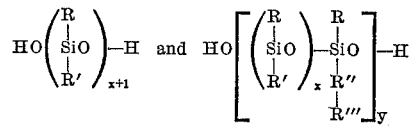

wherein R, R', R'', R''', R'''', R$^a$, R$^b$, R$^c$, Z, $x$, $y$ and $n$ are the same as those defined above.

Examples of suitable organic groups represented by R, R', R$^a$, R$^b$ and R$^c$ above are alkyl radicals having from 1 to 18 carbon atoms such as methyl, ethyl, propyl, butyl, hexyl, octyl, decyl, dodecyl, tetradecyl octadecyl; aryl radicals such as phenyl, diphenyl, dinaphthyl and the like; aralkyl radicals such as benzyl, phenylethyl and the like; alkaryl radicals such as tolyl, xylyl, ethylphenyl and the like; haloaryl radicals such as chlorophenyl, tetrachlorophenyl, difluorophenyl and the like. R'' and R'''' are divalent radicals having from 1 to 14 carbon atoms such as methylene, ethylene, trimethylene, tetramethylene, hexamethylene, octamethylene, decamethylene, phenylene, phenylethylene, diphenylmethylene and the like. The groups represented by R''' are monomers or copolymers having olefinic groups which are grafted to a hydroxyl-terminated organopolysiloxane "backbone" through a carbon-to-carbon linkage. The radicals represented by Z above are saturated aliphatic monoacyl groups derived from organic acids such as formyl, acetyl, propionyl, valeryl, caproyl, myristoyl and stearyl radicals.

Suitable acyloxy disilaorganic cross-linkers are:

1,1,1-triacetoxy-4,4-dimethyl-1,4-disilapentane
1,1,1-triacetoxy-4,4-diethyl-1,4-disilahexane
1,1,1-triacetoxy-5,5-dipropyl-1,5-disilaoctane
1,1,1-triacetoxy-5,5-dibutyl-1,5-disilanonane
1,1,1-triacetoxy-6,6-diethyl-1,6-disilaoctane
1,1,1-triacetoxy-8,8-dimethyl-1,8-disilanonane
1,1,1-triacetoxy-1,10-dipropyl-1,10-disilatridecane
1,1,1-triacetoxy-6,6-dipropyl-1,6-disilanonane
1,1,1-triacetoxy-5-methyl-5-octyl-1,5-disilatridecane
1,1,1-triacetoxy-5,5-dimethyl-1,5-disilahexane
1,1,1-triacetoxy-7,7-diethyl-1,7-disilanonane
1,1,1-tripropionyloxy-4,4-diethyl-1,4-disilahexane
1,1,1-trihexanoyloxy-6,6-diethyl-1,6-disilaoctane
1,1,1-trioctanoyloxy-10,10-dimethyl-1,10-disiladodecane
1-trimethylsilyl-4-triacetoxysilylbenzene
1-tributylsilyl-4-tripropionyloxysilylbenzene
1,1,1-triacetoxy-4,4,4-triphenyl-1,4-disilabutane
1,1,1-triacetoxy-5,5-diphenyl-1,5-disilahexane
1,1,1-trihexanoyloxy-5,5,5-triphenyl-1,5-disilapentane
1,1,1-tribenzoyloxy-44-diphenyl-1,4-disilaheptane and the like.

These disilaorganic cross-linkers containing terminal acyloxy groups may be prepared by reacting trihalodisilaalkanes or trihalodisilaarenes with organic acids or anhydrides thereof in the presence of a solvent at a temperature of from about 25° to about 150° C., preferably from about 50° to about 120° C. For example, 1,1,1-trichloro-4,4-dimethyl-1,4-disilapentane may be reacted with acetic acid or acetic anhydride in the presence of a solvent such as benzene to form 1,1,1-triacetoxy-4,4-dimethyl-1,4-disilapentane. The reaction is generally carried out in the presence of an inert solvent such as aliphatic hydrocarbons, aromatic hydrocarbons, halogenated hydrocarbons and the like. Examples of suitable solvents are pentane, hexane, heptane, octane, benzene, toluene, xylene, naphthalene, methylene chloride chlorobenzene organic ethers such as petroleum ethers, diethyl ether, dibutyl ether and fluid hydroxy-free siloxanes.

The conventional organopolysiloxanes described heretofore may be prepared from difunctional organosilanes of the formula:

wherein R and R' represent monovalent aliphatic or aromatic hydrocarbon radicals or halogenated derivatives thereof and X represents hydrolyzable radicals such as halogen or alkoxy radicals. Examples of suitable radicals represented by R and R' above are methyl, ethyl, propyl, butyl, vinyl, allyl, phenyl, tolyl, xylyl cyclohexyl and cyclohexyl and cyclohexenyl radicals. The organopolysiloxanes may be homopolymers as well as copolymers; that is these compounds may be derived from two or more different diorganosilanes and even the organic radicals linked to any particular silicon atom may be different. Especially useful are the dimethylpolysiloxanes, the methylphenylpolysiloxanes and the methylvinylpolysiloxanes.

In the formation of the grafted organopolysiloxanes, monomers containing olefinic bonds are grafted to the conventional hydroxyl-terminated organopolysiloxanes by using a free-radical initiator, normally organic peroxides. As low as 0.05 percent of the more active peroxide initiators based on the weight of the reactants is adequate in most cases. Where increased reaction rates are desired, as much as 2 percent or even more of the initiator may be used. In general, it is advisable not be exceed about 1 percent since higher concentrations tend to promote coupling reactions which understandably increase the viscosity of the reaction mixture.

In using a free-radical initiator, the reaction may proceed at a satisfactory rate at a temperature between about 60° and 130° C. Where the reaction is carried out in the absence of a free-radical initiator, a substantially higher temperature such as up to about 200° C. may be advantageously used.

Any polymerizable organic monomer having aliphatic olefinic bonds may be grafted to the organopolysiloxane "backbone." Examples of suitable olefinic compounds are low molecular weight straight-chain hydrocarbons such as ethylene, propylene, butylene; vinyl halides such as vinyl chloride and vinyl fluoride; vinyl esters of organic acids such as vinyl acetate; styrene, ring-substituted styrenes and other vinyl aromatics such as vinyl-pyridine and vinylnaphthalene; acrylic acid and derivatives of acrylic acid including the salts, esters, amides and acrylonitrile; N-vinyl compounds such as N-vinylcarbazole, N-vinylpyrrolidone and N-vinylcaprolactam; and vinyl silicon compounds such as vinyltriethoxysilane.

Disubstituted ethylenes of the type $CH_2=CX_2$ may be used including vinylidene fluoride, vinylidene chloride, vinylidene cyanide, methacrylic acid and compounds derived therefrom such as the salts, esters and amides as well as methacrolein, methacrylonitrile and the like.

Examples of disubstituted ethylenes of the type $CHX=CHX$ such as vinylene carbonate and various monomers which polymerize best in the presence of other monomers, e.g. maleic anhydride, esters of maleic and fumaric acids, stilbene, indene and coumarone may be used in the formation of these graft polymers.

As before emphasized, the monomers may be used singly or in combinations of two or three or even more. The properties of the graft product, of course, depend on the nature and identity of the monomer material as well as on the amounts used relative to the organopolysiloxanes. Monomers that give elastomeric homopolymers generally provide elastomeric graft products while those that give plastic homopolymers tend to yield graft products which are less elastic.

The proportion of monomer used in the grafting reaction may be varied within wide limits; however, it has been found that greatly improved physical properties have been obtained when the reaction mixture contains from about 25 to about 75 percent by weight of organic monomer. It is preferred that the organic monomer accounts for from about 40 to 65 percent by weight of the total weight of the reactants.

Although organopolysiloxanes free of terminal-hydroxyl or hydrolyzable groups may be used in the grafting step, it is preferred that the organopolysiloxanes containing terminal-hydroxyl groups be used in the grafting step. Groups which are hydrolyzable at ambient moisture may then be substituted for the hydroxyl groups in a subsequent step to provide a grafted organopolysiloxane which will cure at ambient moisture.

The organopolysiloxanes may contain in minor proportion, molecules having only one hydroxyl group or there may be a smaller number of molecules carrying in excess, two hydroxyl groups. It is preferred, in any event, that the organopolysiloxanes have an average of about 1.75 to about 2.25 hydroxyl groups per molecule.

For purposes of this invention, the organopolysiloxanes and grafted organopolysiloxanes are generally liquids having a viscosity from about 1,000 to about 500,000 centistokes at 25° C., preferably from about 4,000 to about 20,000 centistokes at 25° C.

The curable organopolysiloxanes of this invention may be prepared by reacting acyloxy-terminated disilaorganic cross-linkers with organopolysiloxanes at any convenient temperature although, in general, temperatures ranging from about 20° to about 100° C. are sufficient. It should be understood that higher or lower temperatures may be used, if desired, although, preferably the reaction should be carried out at temperatures below about 120° C.

If desired, the reaction may be carried out in the presence of an inert solvent; that is, a solvent which will not react with the terminal-hydroxyl groups on the organopolysiloxanes. Solvents which may be used include hydrocarbons such as benzene, toluene, xylene, petroleum ethers; halogenated hydrocarbons such as ethylene chloride, perchloroethylene, chlorobenzene and the like; organic ethers such as diethyl ether, dibutyl ether as well as fluid hydroxyl-free siloxanes. The presence of a solvent is particularly desirable when the hydroxyl-terminated organopolysiloxane is of a relatively high viscosity thereby reducing the overall viscosity of the mixture and thus facilitating the reaction.

Although the ratio of acyloxy containing disilaorganic cross-linkers to organopolysiloxanes is not critical, it is preferred that at least one mole of the acyloxy compound, more preferably from about 2 to 5 moles of the acyloxy compound, be used per mole of the silicon bonded hydroxyl group on the organopolysiloxane. Although it is possible to use up to about 12 moles of the acyloxy compound per mole of the silicon bonded hydroxyl groups, the large excess merely insures complete reaction with all the silicon bonded hydroxyl groups, while the excess acts as a scavenger for any moisture which may be present. It is preferred that the reaction be carried out in the absence of moisture since the latter may interfere with the reaction. However, traces of moisture are not especially harmful if an excess of the acyloxy compound is used.

In order to provide a one-package system having a satisfactory cure time, it is preferred that a catalyst be added to the product obtained from the reaction of hydroxyl-terminated organopolysiloxanes and acyloxy-terminated disilaorganic cross-linkers. Especially useful for this purpose are metallic salts of organic acids such as tin naphthenate, tin-2-ethyl hexanate, tin benzoate, dibutyltin dilaurate and dibutyltin diacetate. Other metallic salts are those of lead, zirconium, antimony, iron, cadmium, barium, titanium, bismuth and manganese. Examples of such metallic salts are lead octoate, iron stearate, antimony octoate and the like.

The amount of catalyst is not critical; however, it is preferred that the metal ion in the form of the metallic salt be present by weight in an amount of from about 0.001 to about 5 percent by weight of the organopolysiloxane.

The compositions of this invention may be cured by merely exposing them to atmospheric moisture with or without any additional water vapor. Upon exposure to moisture, the compositions cure at times varying from a few minutes to several hours or days depending upon the type of organic and acyloxy groups present. In general, an increase in the molecular weight of any of the groups will increase the cure time.

The curable compositions, according to the present invention, may consist solely of a catalyst and the product obtained from the reaction of a siloxane and an acyloxydisilaalkane and/or acyloxydisilaarene. However, the properties of the uncured as well as the cured composition may be modified by incorporating therein mineral fillers in the form of very fine powders.

Examples of suitable mineral fillers are silicas, oxides of iron, zinc, cadmium, aluminum and carbonates. Silica fillers which may be used are those sold under the tradenames Santocel, Hi-Sil and Aerosil. These fillers are microfine products formed of particles having the size of the order of 10–20 millimicrons and have a high absorptive power. The amount of filler employed is not critical and very small amounts are effective. However, large proportions, for example, 100 percent based on the weight of the organopolysiloxane may be used in certain cases. The particular filler and proportion in which it is used will depend to a great extent on the particular use to which the composition is to be applied.

Apart from the fillers mentioned heretofore, compositions conforming to the invention may contain coloring agents, thixotropic agents, agents capable of preventing the passage of ulrtaviolet light, desiccants and antioxidants.

In addition, these curable compositions may contain organic diluents which are compatible with the organopolysiloxane. Examples of suitable organic diluents are aromatic hydrocarbons such as benzene, toluene, xylene; aliphatic hydrocarbons such as hexane, heptane and halogenated aliphatic hydrocarbons such as methylene chloride and the like. The amount of diluent should be kept to a minimum, since it will have to be vaporized off in order to obtain a satisfactory cure.

The curable compositions of this invention may be prepared by mixing liquid hydroxyl-terminated organopolysiloxanes and a filler, if desired, in a conventional mixing apparatus such as a Sigma blade mixer, roller mill or Banbury mixer and thereafter heating the mixture to sufficient temperature to eliminate all traces of moisture. The mass is then cooled and an acyloxydisilaalkane and/or an acyloxydisilaarene is mixed with the organopolysiloxane and a catalyst and, if desired, an inert anhydrous organic diluent. The composition is then transferred under anhydrous conditions into dry containers which are then hermetically sealed. The products thus prepared may be kept for several months and even years.

In the absence of moisture, these compositions may be stored for prolonged periods of time without any deleterious effects. Thus, it assures that once a composition is prepared with a certain consistency and cure time, neither will change to any great extent upon storage. This stability on storage is the characteristic which makes a composition of this invention particularly useful as a one-component room temperature curing composition.

The products of this invention adhere to a variety of materials such as, for example, wood, metal, glass, ceramics, plastics and the like. In the case of metal, it may be desirable to pre-treat the metal prior to the application of the compositions of this invention. These self-curing compositions may serve as caulking materials, coatings for various articles such as electrical equipment, glass, metal, fabrics and in the production of films and molded articles. These compositions may be applied by any conventional technique such as by dipping, spraying or extrusion.

Various aspects of the invention are further illustrated by the following examples which are not to be considered as in any way limiting the scope thereof. In the examples, all parts are by weight unless otherwise specified.

EXAMPLE 1

To a reactor containing about 235.6 parts of 1,1,1-trichloro - 4,4 - dimethyl - 1,4 - disilapentane is added about 337 parts of acetic anhydride and heated to reflux temperature with agitation. After the reaction temperature reaches about 95° C., the reactor is evacuated at about 71 mm. Hg for about 5 hours at a temperature of about 95° C. A clear, slightly yellow liquid product is obtained which contains 1,1,1 - triacetoxy - 4,4 - dimethyl - 1,4-silapentane.

EXAMPLE 2

In accordance with the procedure described in Example 1, about 420 parts of propanoic anhydride is substituted for the acetic anhydride. A product is recovered which contains 1,1,1 - tripropionyloxy - 4,4 - dimethyl - 1,4 - disilapentane.

EXAMPLE 3

In accordance with the procedure described in Example 1, about 520 parts of n-butanoic anhydride is substituted for the acetic anhydride. A product is recovered which contains 1,1,1 - tributanoyloxy - 4,4 - dimethyl - 1,4 - disilapentane.

EXAMPLE 4

In accordance with the procedure described in Example 1, about 610 parts of pentanoic anhydride is substituted for the acetic anhydride. A product is recovered which contains 1,1,1 - tripentanoyloxy - 4,4 - dimethyl - 1,4 - disilapentane.

EXAMPLE 5

In accordance with the procedure described in Example 1, approximately 78.5 parts of 1,1,1-trichloro-4,4-dimethyl-1,4-disilapentane is reacted with about 214.3 parts of hexanoic anhydride. A product is recovered which contains 1,1,1 - trihexanoyloxy - 4,4 - dimethyl - 1,4 - disilapentane.

EXAMPLE 6

In accordance with the procedure described in Example 1, approximately 297 parts of propenoic anhydride is reacted with about 78.5 parts of 1,1,1-trichloro-4,4-dimethyl-1,4-disilapentane. A product is recovered which contain 1,1,1 - tripropenoyloxy - 4,4 - dimethyl - 1,4, - disilapentane.

EXAMPLE 7

In accordance with the procedure described in Example 1, approximately 600 parts of stearic anhydride is reacted with about 78.5 parts of 1,1,1-trichloro-4,4-dimethyl-1,4-disilapentane. A product is recovered which contains 1,1,1 - stearoyloxy - 4,4 - dimethyl - 1,4 - disilapentane.

EXAMPLE 8

In accordance with the procedure described in Example 1, approximately 263 parts of 1,1,1-trichloro-6,6-dimethyl-1,6-disilaheptane is reacted with about 337 parts of acetic anhydride. A product is recovered which contains 1,1,1 - triacetoxy - 6,6 - dimethyl - 1,6 - disilaheptane.

EXAMPLE 9

In accordance with the procedure described in Example 1, about 361 parts of 1,1,1-trichloro-10,10-diethyl-1,10-disiladodecane is reacted with about 337 parts of acetic anhydride. A product is recovered which contains 1,1,1-triacetoxy - 10,10 - diethyl - 1,10 - disiladodecane.

EXAMPLE 10

In accordance with the procedure described in Example 1, approximately 361 parts of 1,1,1-trichloro-10,10-diethyl-1,10-disiladodecane is reacted with about 520 parts of butanoic anhydride. A product is recovered which contains 1,1,1 - butanoyloxy - 10,10 - diethyl - 1,10 - disiladodecane.

EXAMPLE 11

In accordance with the procedure described in Example 1, approximately 235 parts of 1,1,1-trichloro-4,4-dimethyl-1,4-disilapentane is reacted with about 198 parts of acetic acid. A product is recovered which contains 1,1,1-triacetoxy-4,4-dimethyl-1,4-disilapentane.

EXAMPLE 12

In accordance with the procedure described in Example 1, approximately 263.5 parts of 1,1,1-trichloro-6,6-dimethyl-1,6-disilaheptane is reacted with about 280 parts of butanoic acid. A product is recovered which contains 1,1,1-tributanoyloxy-6,6-dimethyl-1,6-disilaheptane.

EXAMPLE 13

Approximately 361 parts of 1,1,1 - trichloro-10,10-diethyl-1,10-disiladodecane is reacted with about 660 parts of lauric acid. A product is recovered which contains 1,1,1-trilauroyloxy - 10,10 - diethyl-1,10-disiladodecane.

EXAMPLE 14

Grafted organopolysiloxanes are prepared by grafting olefinic compounds to hydroxyl-terminated organopolysiloxanes by reacting olefinic compounds with polydimethylsiloxanes in the presence of a free-radical initiator at a temperature of from about 60° to about 190° C. The unreacted olefinic compounds are removed at an elevated temperature by applying a vacuum of about 1 mm. Hg or less while continuing to heat and stir for an additional hour. The pertinent data is illustrated in Table I.

TABLE I

| Example No.: | Olefinic Compound | | Hydroxylated Fluid | | Free-Radical Initiator | | Reaction Conditions | | Final Polymer, Viscosity, cs. |
|---|---|---|---|---|---|---|---|---|---|
| | Type | Parts | Viscosity | Parts | Type | Parts | Temp., °C. | Time, hr. | |
| 14(a) | Acrylonitrile<br>Butylacrylate | 14.6<br>35.4 | 1,900 | 50 | t-BP | 0.50 | 80 | 1.5 | 14,000 |
| 14(b) | Acrylonitrile<br>Butylacrylate | 9.0<br>51.0 | 800 | 40 | t-BP | 0.50 | 80 | 1.7 | 7,800 |
| 14(c) | Acrylonitrile<br>Ethylacrylate<br>Butylacrylate | 9.1<br>2.9<br>48.0 | 800 | 40 | t-BP | 0.25 | 80 | 2.0 | 20,200 |
| 14(d) | Methyl acrylate | 50.0 | 400 | 50 | t-BP | 0.50 | 80 | 4.0 | 15,500 |
| 14(e) | Lauryl methacrylate | 70.0 | 400 | 30 | t-BP | 0.50 | 80 | 5.0 | 19,400 |
| 14(f) | Styrene<br>Butylacrylate | 250.0<br>204.0 | 610 | 304 | t-BP | 2.00 | 125 | 24.0 | 14,500 |
| 14(g) | Vinyl chloride | 45.0 | 6,700 | 350 | t-BPer | 1.80 | 80 | 4.0 | 17,800 | t-BP=tertiary-butyl peroxide.
t-BPer=tertiary-butyl peroctoate.

EXAMPLE 15

A reactor containing 31.3 parts of a grafted hydroxyl-terminated organopolysiloxane prepared in accordance with the procedure described in Example 14(a) is evacuated for about 10 minutes. About 3 parts of the product prepared in accordance with Example 1 is added to the reactor and heated to a temperature of about 80° C. with agitation. After about 1 hour, the volatile materials are removed by vacuum distillation and the residual product placed in a mold and allowed to cure at room temperature. The product did not cure after being exposed to atmospheric moisture for about 8 days.

In accordance with the procedure described above, about 0.1 part of a dibutyltin dilaurate catalyst is incorporated in the mixture. The product cured to a tack-free condition in about 1 hour.

EXAMPLES 16 TO 28

In the following examples, hydroxyl-terminated organopolysiloxanes are charged into a reactor and evacuated for about 10 minutes. Acyloxydisilaalkanes prepared in accordance with the procedures described in the above examples are added to the reactor and heated to a temperature of about 80° C. with agitation. After about 1 hour, the volatile materials are removed by vacuum distillation and the residual product placed in a mold and allowed to cure at ambient moisture and temperature. The molds are checked periodically to ascertain when the surface is tack-free. The results of these experiments are illustrated in Table II.

TABLE II

| | OH-Fluid | | | Disilyl Composition | | Catalyst | | Track-free Time, hours |
|---|---|---|---|---|---|---|---|---|
| | Type | Viscosity, cs. | Parts | Example No. | Parts | Type | Parts | |
| Example No.: | | | | | | | | |
| 16 | DMPS | 4,000 | 33.3 | 2 | 3 | | | Fluid after 72. |
| 17 | G-DMPS, Ex. 14(a) | 14,000 | 33.3 | 2 | 3 | | | Do. |
| 18 | DMPS | 4,000 | 33.3 | 2 | 3 | DBT DL | 0.33 | 0.78. |
| 19 | G-DMPS, Ex. 14(a) | 14,000 | 33.3 | 2 | 3 | DBT DL | 0.33 | 0.80. |
| 20 | DMPS | 800 | 33.3 | 3 | 3 | | | Fluid after 72. |
| 21 | DMPS | 8,000 | 33.3 | 4 | 3 | | | Do. |
| 22 | DMPS | 4,000 | 33.3 | 11 | 3 | | | Do. |
| 23 | DMPS | 4,000 | 33.3 | 11 | 3 | DBT DL | 0.33 | 0.64. |
| 24 | G-DMPS, Ex. 14(c) | 20,200 | 33.3 | 3 | 3 | | | Fluid after 72. |
| 25 | G-DMPS, Ex. 14(c) | 20,200 | 33.3 | 3 | 2 | DBT DL | 0.30 | 0.72. |
| 26 | G-DMPS, Ex. 14(c) | 20,200 | 33.3 | 11 | 3 | DBT BC | 0.30 | 0.67. |
| 27 | G-DMPS, Ex. 14(f) | 14,500 | 33.3 | 12 | 3 | DBT DL | 0.30 | 1.75. |
| 28 | G-DMPS, Ex. 14(g) | 17,800 | 33.3 | 8 | 3 | DBT DL | 0.30 | 1.22. |

DMPS = Dimethylpolysiloxane.
G-DMPS = Grafted Dimethylpolysiloxane.
DBT DL = Dibutyltin Dilaurate.
DBT BC = Dibutyltin Butoxychloride.

When the above examples are repeated utilizing other hydroxyl-terminated polysiloxanes with other disilaorganic compounds containing acyloxy groups in the alpha position, substantially the same results were obtained as those illustrated above.

Although specific examples of the invention have been described herein, other variations and modifications falling within the sphere and scope of the appended claims are to be included therein.

The invention claimed is:

1. A curable one-component organopolysiloxane composition comprising an organopolysiloxane having the formula:

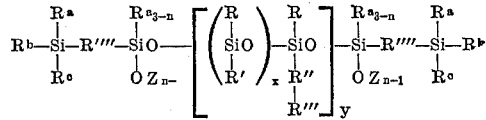

wherein R, R′, R$^a$, R$^b$, and R$^c$ are selected from the group consisting of monovalent hydrocarbon radicals, halogenated monovalent hydrocarbon radicals and cyanoalkyl radicals; R′′′′ is selected from the group consisting of a divalent hydrocarbon radical and a halogenated divalent hydrocarbon radical; each is a monoacyl radical derived from a carboxylic acid having not more than 18 carbon atoms; $n$ is a number greater than 2 and up to 3 and $x$ is a number of from 0 to 20,000.

2. A curable composition according to claim 1 when the organopolysiloxane meets the formula:

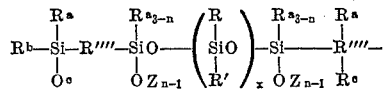

wherein R′′ is selected from the group consisting of divalent hydrocarbon radicals and halogenated divalent hydrocarbon radicals; R′′′ is a polymeric organic side chain linked to R′′ via an alkylene group; said polymeric organic side chain being constituted of recurring units derived from organic monomers containing ethylenic unsaturation, said monomers being selected from the class consisting of straight chain olefins whether or not attached to an aromatic nucleus, halogenated olefins again whether or not attached to an aromatic nucleus, unsaturated acids, esters of organic acids in which either the esterfying group or the derivative acid is unsaturated, unsaturated amides and unsaturated nitriles and $y$ is a number of from 1 to 500.

3. The composition of claim 2 which contains a metallic salt of a carboxylic acid as a curing catalyst, the metal of said salt being selected from the class consisting of tin, lead, zirconium, antimony, iron, cadmium, barium, titanium, bismuth and manganese.

4. The composition of claim 3 wherein the catalyst is a tin salt of a carboxylic acid.

5. The composition of claim 1 wherein R′′′′ is an alkylene group having from 1 to 12 carbon atoms.

6. The composition of claim 1 which contains a metallic salt of a carboxylic acid as a curing catalyst, the metal of said salt being selected from the class consisting of tin, lead, zirconium, antimony, iron, cadmium, barium, titanium, bismuth and manganese.

7. The composition of claim 6 wherein the catalyst is a tin salt of a carboxylic acid.

8. A method for preparing a curable organopolysiloxane composition which comprises reacting a disilaorganic compound of the formula:

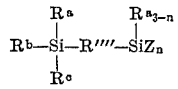

with a hydroxyl-terminated organopolysiloxane of the formula:

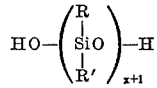

wherein R, R′, R$^a$, R$^b$, and R$^c$ are selected from the group consisting of monovalent hydrocarbon radicals, halogenated monovalent hydrocarbon radicals and cyanoalkyl radicals; R′′′′ is selected from the group consisting of a divalent hydrocarbon radical and a halogenated divalent hydrocarbon radical; Z is a monoacyl radical derived from a carboxylic acid having not more than 18 carbon atoms; $n$ is a number greater than 2 and up to 3; and $x$ is a number of from 0 to 20,000 and thereafter adding a catalytic amount of a metallic salt of a carboxylic acid capable of curing the composition to an elastomer on exposure of the composition to ambient moisture and temperature, the metal of said salt being selected from the class consisting of tin, lead, zirconium, antimony, iron, cadmium, barium, titanium, bismuth, and manganese.

9. The method of claim 8 wherein the organopolysiloxane has the formula:

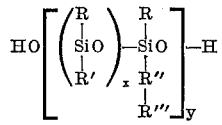

wherein R and R′ are selected from the group consisting of monovalent hydrocarbon radicals, halogenated monovalent hydrocarbon radicals and cyanoalkyl radicals; R′′ is selected from the group consisting of a divalent hydrocarbon radical and a halogenated divalent hydrocarbon radical; R′′′ is a polymeric group linked to R′′ by a carbon-to-carbon linkage, said polymeric group being constituted of recurring units derived from monomers containing ethylenic unsaturation, said monomers being selected from the class consisting of straight chain olefins whether or not attached to an aromatic nucleus, halogenated olefins again whether or not attached to an aromatic nucleus, unsaturated acids, esters of organic acids in which either the esterifying group or the derivative acid is unsaturated, unsaturated amides and unsaturated nitriles; $x$ is an integer of from 0 to 20,000 and $y$ is a number of from 1 to 500.

References Cited
UNITED STATES PATENTS

| | | | |
|---|---|---|---|
| 3,109,826 | 11/1963 | Smith | 260—18 |
| 3,338,951 | 8/1967 | Knaub | 260—46.5 |
| 3,382,193 | 5/1968 | Cuthill | 260—2 |
| 3,385,727 | 5/1968 | Thomas et al. | 260—46.5 |

DONALD E. CZAJA, Primary Examiner

M. I. MARQUIS, Assistant Examiner

U.S. Cl. X.R.

117—124, 135.1, 138.8, 148, 161; 260—37, 45.7, 46.5, 448.8

UNITED STATES PATENT OFFICE
CERTIFICATE OF CORRECTION

Patent No. 3,477,973                                    November 11, 1969

Guenther Fritz Lengnick et al.

It is certified that error appears in the above identified patent and that said Letters Patent are hereby corrected as shown below:

Column 2, lines 39 to 41, the formula should appear as shown below:

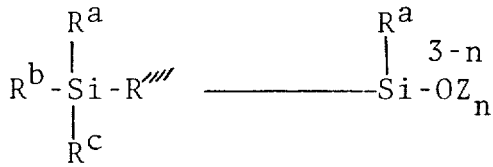

Column 3, line 27, "1,1,1-tribenzoyloxy-44-diphenyl-1,4-disilaheptane" should read -- 1,1,1-tribenzoyloxy-4,4-diphenyl-1,4-disilaheptane --; line 61, cancel "cyclohexyl and". Column 4, line 2, "be" should read -- to --. Column 6, line 62, "silapentane" should read -- disilapentane --. Column 9, lines 35 to 38, the formula should appear as shown below:

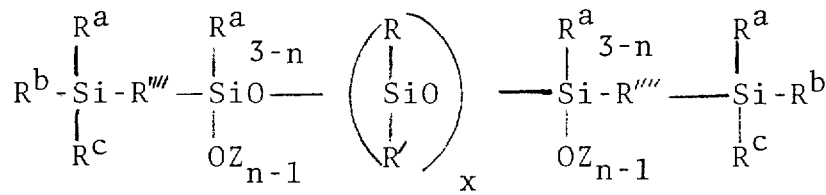

line 44, after "each" insert -- Z --; same column 9, lines 50 to 54, the formula should appear as shown below:

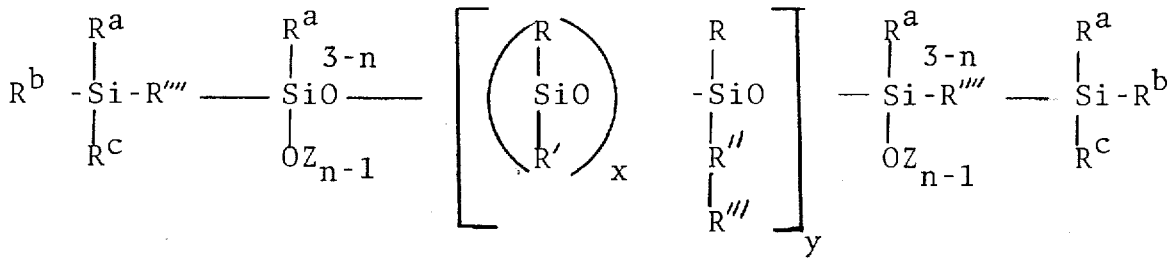

Signed and sealed this 23rd day of March 1971.

(SEAL)
Attest:

EDWARD M. FLETCHER, JR.                      WILLIAM E. SCHUYLER, JR.
Attesting Officer                                        Commissioner of Patents